Sept. 12, 1967  P. F. BURCH  3,340,916
SKINNING MACHINE BLADE MOUNT

Filed Aug. 24, 1964  2 Sheets-Sheet 1

INVENTOR.
PAUL F. BURCH
BY
*Price & Heneveld*
ATTORNEYS

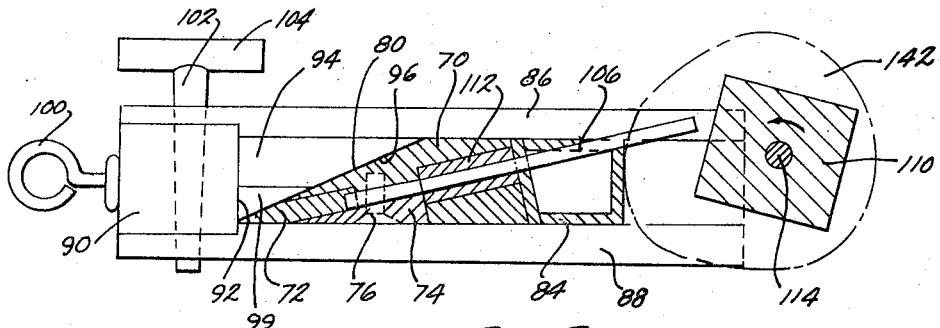
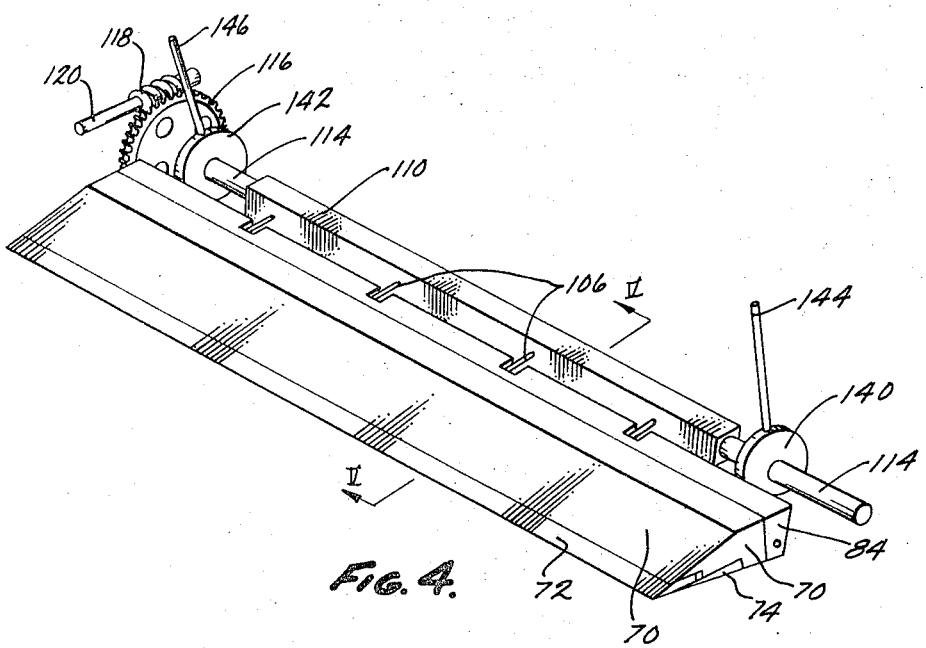

United States Patent Office 3,340,916
Patented Sept. 12, 1967

3,340,916
SKINNING MACHINE BLADE MOUNT
Paul F. Burch, Rockford, Mich., assignor to Wolverine Shoe & Tanning Corporation, Rockford, Mich., a corporation of Michigan
Filed Aug. 24, 1964, Ser. No. 391,512
11 Claims. (Cl. 146—130)

This invention relates to skinning machines, and more particularly to a skinning machine blade mounting assembly.

Skinning machines, particularly those employed for separating the meat from the skin of hogsides, commonly employ a rotatable hogside pulling and supporting drum, and an adjacent fixed shearing blade. Since the fibers to be severed during skinning are tough, the skinning blade must be maintained extremely sharp to avoid excessive "drag" at the blade. This drag, if substantial, causes skinning problems. After every few hours of operation, therefore, a skilled workman must disassemble the blade mounting assembly, remove the blade, sharpen it, replace it, and adjust the blade to exact alignment with the drum periphery and the axis of rotation of the drum. With conventional blade assemblies, this process takes at least about one-half hour even with the most experienced and skillful workman. Consuming a large portion of this time is the resetting or realignment process, a tedious, exacting job, but so necessary since the newly sharpened blade edge must align exactly with the rotational axis of the drum and the drum periphery. Extreme accuracy is required since a few thousandths of an inch offset discrepancy at either end of the blade, or of the entire blade, will cause too deep a cut into the skin or too shallow a cut. This can result in the valuable meat either having excess rind or being wasted by leaving meat on the skin. The time required for sharpening and accurate resetting, though necessary, often serves as a serious "bottleneck" in a high speed packing house production line.

It is therefore an object of this invention to provide a novel skinning machine blade assembly enabling rapid, easy removal of the blade for sharpening, and of more importance, rapid, easy reassembly with exact locating, yet without significant time consumption. The entire operation requires only a few minutes.

It is another object of this invention to provide a skinning machine blade assembly enabling a relatively unskilled person to remove and reinsert a sharp blade without careful resetting, yet achieving accurate location with respect to the drum axis and periphery.

Still another object of this invention is to provide a skinning apparatus blade assembly that has a special blade insert allowing substitution of a sharpened insert for a dull insert, without the necessity of removing the complete large blade itself, and without the necessity of requiring expensive extra blade of the normal large size to be kept as spares. Further, the blade insert can be exactly positioned with no special skill when inserted, thereby allowing any workman to make the change-over in a few minutes without seriously affecting the production line of the packing house.

Another object of this invention is to provide a blade assembly having a blade insert with unique retaining means that not only secures the insert in position, but also prevents bending of the insert under the stress of the hogside during the skinning action.

These and several other objects of this invention will become apparent upon studying the following specification in conjunction with the drawings in which:

FIG. 4 is a perspective view of the blade assembly of this structure without the end supports; and FIG. 5 is a sectional elevational view of the apparatus in FIG. 4, taken on plane V—V.

Figure 1:
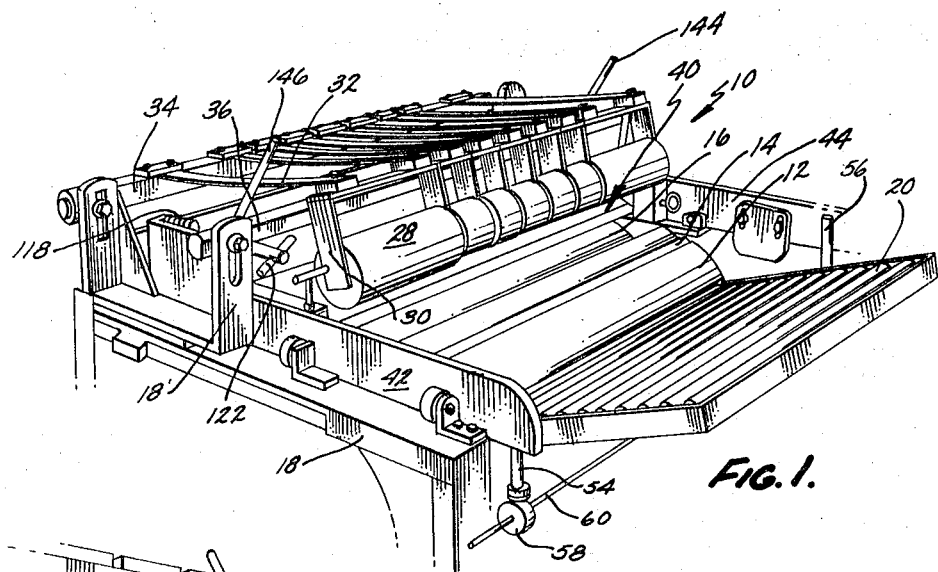
FIG. 1 is a perspective view of a skinning machine employing this invention, viewing the machine from the input side.

Referring now specifically to the apparatus illustrated in the drawings, the complete skinning machine 10 includes a drum 12 rotationally mounted on its central axis. It has an axially elongated clamping means 14 in a peripheral ditch 16, shown and claimed in U.S. patent application Ser. No. 349,254, filed Mar. 4, 1964, now Patent No. 3,291,175, entitled, Skinning Machine, for example.

The drum is rotatably mounted and is driven by a suitable gear box assembly 24. Mounted adjacent the drum on framework 18 is a hogside infeed conveyor 20 of conventional type. Positioned above the drum is a plurality of fold-down rollers 28, each mounted on bracket means 30. Each bracket is supported on the end of an elongated leaf spring 32. The opposite ends of the springs are attached to a cross bar 34. The cross bar is supported by framework 18. A transverse pressure regulating bar 36 is mounted to the framework between the ends of the leaf springs to allow vertical adjustment thereof. This vertical adjustment is achieved by raising and lowering bars 34 and 36 on their respective legs of bracket 18'.

Figure 2:
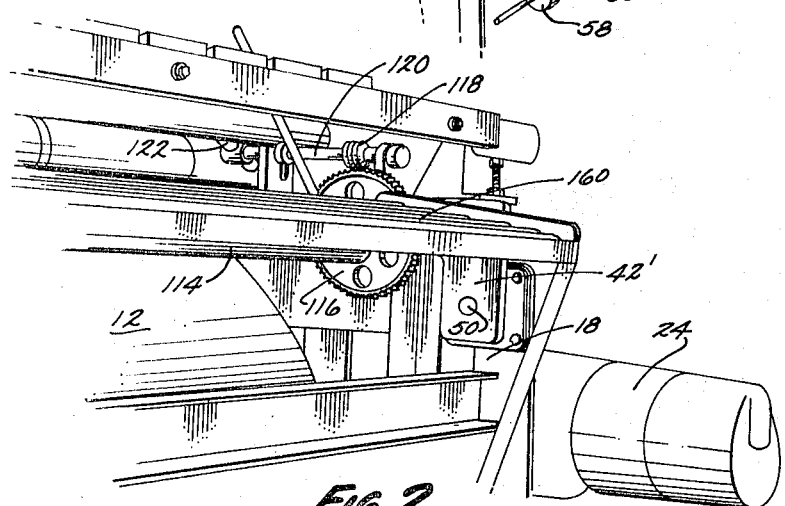
FIG. 2 is a fragmentary perspective view of the machine in FIG. 1, viewed from the output side.

Extending axially of the drum and across the upper peripheral portion thereof, parallel to the axis of rotation of the drum, is blade assembly 40. The basic support elements for this blade assembly comprise a pair of parallel arms 42 and 44 on opposite ends of the drum. These extend across the framework from front to back. Each is basically L-shaped in configuration, with the long leg of the L extending horizontally past the drum, and the short leg of the L extending downwardly (as at 42' on arm 42, FIG. 2). The lower end of the short legs are pivotally mounted at 50 to framework 18. The opposite ends of the long legs are supported on a pair of respective vertical rods 54 and 56 which extend downwardly and rest on adjusting cams 58 both mounted to a common control shaft 60. Rotation of shaft 60 raises and lowers the elongated ends of these supports 42 with respect to their pivot points 50, to raise and lower blade assembly 40 mounted intermediate the ends of these arms, and more specifically, the ends of the long legs. This regulates the depth of cut.

The blade means itself includes two major components, a holder 70 having an elongated slot in its forward edge, and a blade insert 72 positioned in this slot with its sharp edge protruding therefrom. The holder actually is preferably formed of two elements including a first major component and an attached bolted underside cover 74 secured by screws 76 to hold insert 72 in place. The forward edge of holder 70 is convergent in nature, tapering to the blade insert 72. It has a flat horizontal underside, and a diagonal front face 80 coplanar with the edge of blade insert 72. Secured along the back side of elongated holder 70 is an elongated steam jacket 84 to constantly heat the blade in conventional manner.

Figure 3:
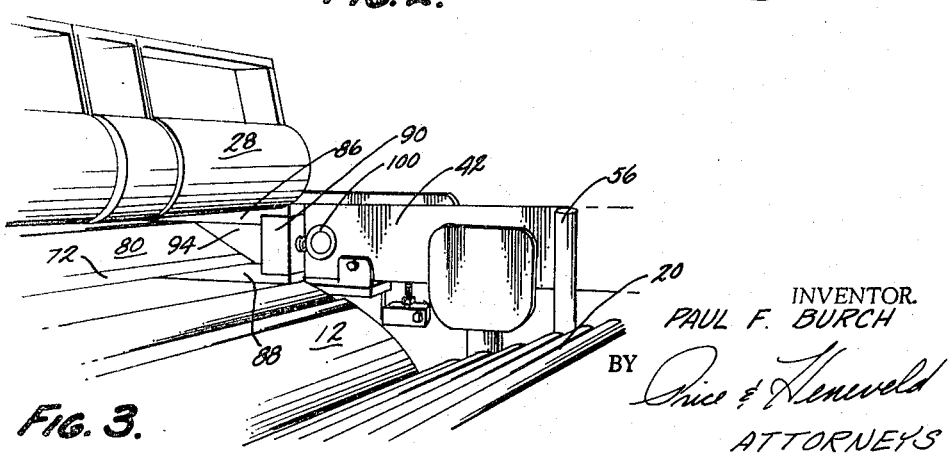
FIG. 3 is a fragmentary, enlarged, perspective view of a segment of the apparatus in FIG. 1.

The ends of this blade means are supported between a pair of respective upper and lower plates or flanges 86 and 88 at each end. These flanges are parallel to each other and rigidly attached to the arms 42 and 44 to project therefrom as shown in FIG. 3. The forward ends of these plates are in engagement with a slidably removable stop plug on each end of the blade. Each plug 90 slides between the two plates to interfit snugly therewith. Each plug includes a forward block portion having a rear face 92 aligned with the axis of rotation of the drum. Secured to block 90 is a rearwardly projecting portion 94 which has a diagonal surface 96 to abut the front face 80 of holder 70. A space 99 exists between the back surface of block 90, portion 94, and blade insert 72. A suitable handle ring 100 is provided on this plug so that it can be slidably withdrawn to remove block 90 and portion 94. Normally, the block is held aligned with respect to the two plates in a particular selected position by a vertical taper pin 102 slidably interengaged through the plates and block. It is retractable by its handle 104.

Extending through the back side of holder 70, through elongated openings therein, is a plurality of elongated rod-like elements 106. The forward ends of these rods abut the back edge of blade insert 72 at spaced intervals along its length. The rearward ends of these rods abut the pivotal, eccentric, elongated actuator 110. This pivotal actuator is shown to be square in cross sectional configuration, but may be of other configurations so long as it can serve as a camming eccentric to abut and axially shift pins 106 within their bushings 112 against the back side of the blade insert 72.

Eccentric 110 is keyed to its rotational operation shaft 114. Shaft 114 is rotated by a keyed spur gear 116, operably engaged with a worm gear 118 on shaft 120. Shaft 120 is rotated by a handle 122 (FIG. 1). Hence, turning of handle 122 rotates eccentric 110 to shift pins 106 into abutment against the back side of blade insert 72. This pushes the blade insert ends tightly against face 92 on the inner back side of block 90. Faces 92 of the spaced blocks in the opposite ends of the mechanism are preset to be in a plane that includes the axis of rotation of drum 12. This is done by preliminary machining of these faces and control of the taper pin fit. The forward edge of blade insert 72 therefore is always and automatically coplanar with the rotational axis of the drum.

Also mounted on shaft 114, and pivotal thereon, but not keyed thereto, is a pair of spaced disc-type cams 140 and 142. Each is pivotal on the shaft. These are controlled by a respective set of handles 144 and 146. The periphery of these disc cams abut the back side of the steam jacket 84 of the blade assembly. Rotation of these cams to the position illustrated in FIG. 5 forces the blade assembly ahead until the diagonal forward face 80 of the blade holder abuts against the diagonal, corresponding surface 96 of block portion 94.

The pins 106 are at spaced intervals across the length of the blade assembly (unlike disc cams 140 and 142 only at the opposite ends of the assembly) since insert 72 tends to be somewhat flexible to be readily deformed as the tough hogside is pulled past it. The plurality of pins at spaced intervals, therefore, prevent bending deformation of the insert.

Previously, the complete blade structure comprised one integral element made of expensive, rigid, heavy steel construction to prevent deformation. Ordinarily, these large blades are expensive and difficult to manipulate. Therefore, usually only one or two blades are owned by each packing house for the machine. With the novel insert, however, and utilizing the novel camming mechanism, a packing house can readily afford to have a few of these inserts on hand.

Along the back side of the skinning blade assembly is a lead-off conveyor 160 (FIG. 2) to remove the slab of meat from the machine. The skin is retained in the clamp and dropped into a suitable container beneath the drum as the drum is revolving.

In operation, as a hogside is fed into the assembly on conveyor 20 with the skin side down, its forward edge is inserted into and held by clamping means 14. The drum is then revolved one revolution. As it revolves past skinning blade assembly 40, the skin and meat of the hogsides are separated, with the meat passing off on conveyor 160 (FIG. 2) and the skin being dropped into a suitable container beneath the mechanism as the clamp opens.

When the insert blade becomes dull, the operator merely flips handles 144 and 146 back to release the pressure on blade holder 70 against its guide and stop surface 96. He then twists handle 122 to rotate shaft 120 and worm gear 118. This turn spur gear 116 and shaft 114 to withdraw eccentric 110 from abutment with pins 106. This releases the pressure of blade insert 72 on the pivot blocks 92, allowing taper pins 102 to be withdrawn by grasping their handles 104 and lifting. With these taper pins withdrawn, blocks 90 with their extensions 94 are slidably retracted from both ends of the blade assembly holder by pulling on rings 100. When block-type stop means 90, 94 are withdrawn, the entire blade assembly, including the holder and blade insert, can be retracted merely by sliding it forwardly out of the unit. The blade insert 72 is then slid out of its slot and replaced by an equivalent sharpened insert. The assembly is then slid back between plates 86 and 88 on opposite ends of the drum. Blocks 90, 94 are reinserted, taper pins 102 are slid into position, cams 140 and 142 are pivoted by pivoting handles 144 and 146, handle 122 is rotated to pivot elongated eccentric 110 against pins 106 and abut them against the back side of insert 72. This forces the forward sharp edge of the insert into alignment against the back side of blocks 90, and the unit is then ready for operation again. The entire replacement process takes only a few minutes at most. Further, the forward sharp edge of the blade insert is exactly coplanar with the center line axis of the drum since blocks 90 are exactly positioned by taper pins 102. When the cams bind the blade assembly into position, it is not free to move. Further, as the drum pulls the hogside past the blade, any tendency for the central portion of the blade insert to deflect is resisted by the pins at spaced intervals along the length of the blade assembly.

Various additional advantages will occur to those in the art upon studying the foregoing preferred form of the invention, as well as certain obvious minor structural changes and details. The invention is to be limited, therefore, only by the scope of the appended claims and the reasonably equivalent structures to those defined therein.

I claim:

1. A blade assembly for a skinning machine comprising: a slotted blade holder and support means therefor; a sharp edge insert in said slotted holder with the sharp edge protruding therefrom; blade insert positioning and aligning stop means adjacent the sharp edge of said insert; to exactly align said sharp edge with respect to said blade holder and support means; and cooperative camming means along the back side of said insert for shifting said insert against said stop means, including a plurality of spaced elements at intervals along the back edge of said insert.

2. In a skinning machine including a framework and hogside shifting means, an improved skinning blade assembly comprising: a pair of spaced blade support means mounted to said framework; each of said support means including spaced lower and upper support elements and a removable front end stop element slidably engaged therewith, with each stop element having blade aligning stop portions; removable fastener means between said support elements and said stop element; blade means having the opposite ends thereof received by said pair of blade support means; said blade means including a sheath type slotted holder and a removable sharp edged insert in said holder with its edge projecting therefrom; the ends of said insert abutting said blade aligning stop portions of said stop elements; stop means in said pair of blade support means also abutting forward portions of said slotted holder; shiftable first camming means abutting the back side of said holder to retain it against said stop means; and second shiftable camming means abutting against the back edge of said blade insert to force it against said stop portions.

3. The blade assembly in claim 2 wherein said second camming means includes a plurality of shiftable projections cooperatively engaged with said second camming means and projecting through said holder into contact with the back edge of said insert at spaced intervals thereacross to force said insert against said stop portions and also prevent deformation of said insert during skinning.

4. In a skinning machine including a framework, and a rotatably driven drum mounted on said framework and having axially extending peripheral clamping means, an improved skinning blade assembly in combination therewith, comprising: a pair of blade support means mounted to said framework on opposite ends of said drum, adjacent a peripheral portion thereof; each of said support means including blade stop means having a stop surface aligned with the axis of rotation of said drum; blade means having the ends thereof supported in said pair of support means, and including a slotted holder and a blade insert with a sharp edge projecting from said holder; and camming means in operative relationship with the back edge of said insert forcing said insert against said stop means for securement and alignment.

5. In a skinning machine including a framework, and a rotatably driven drum mounted on said framework and having axially extending peripheral clamping means, an improved skinning blade assembly in combination therewith, comprising: a pair of blade support means mounted to said framework on opposite ends of said drum, adjacent a peripheral portion thereof; each of said support means including blade stop means having a stop surface aligned with the axis of rotation of said drum; blade means having the ends thereof supported in said pair of support means, and including a slotted holder and a blade insert with a sharp edge projecting from said holder; camming means in operative relationship with the back edge of said insert forcing said insert against said stop means for securement and alignment; said camming means including shiftable elongated actuator means extending along the back side of said blade means, and a plurality of movable elements extending between said actuator means and the back edge of said insert at spaced intervals along said insert.

6. The combination in claim 5 wherein said actuator means comprises elongated eccentric means mounted on an axis parallel to said insert, and said elements are elongated, axially movable rods extending through said holder into abutment with the back edge of said insert.

7. In a skinning machine including a framework, and a rotatably driven drum mounted on said framework and having axially extending peripheral clamping means, an improved skinning blade assembly in combination therewith, comprising: a pair of blade support means mounted to said framework on opposite ends of said drum, adjacent a peripheral portion thereof; each of said support means including spaced lower and upper plates, a removable front end plug slidably engaged between said plates and a removable tapered lock pin extending vertically through said plates and plug to secure said plug in exact position with respect to the rotational axis of said drum; back side portions of both plugs between said plates being in the same plane as said drum rotational axis; blade means having the opposite ends thereof received by said pair of blade support means; said blade means including a sheath type slotted holder and a removable sharp edged insert in said holder with its edge projecting therefrom; the ends of said insert abutting said back side portions of said plugs; a pair of stop means in said pair of blade support means abutting forward portions of said slotted holder; shiftable first camming means abutting the back side of said holder to retain it against said stop means; and second shiftable camming means; a plurality of shiftable projections cooperative with said second camming means and projecting through said holder into contact with the back edge of said insert at spaced intervals thereacross to force said insert against said back side portions and prevent deformation of said insert during skinning.

8. In a skinning machine including a framework, and a rotatably driven drum mounted on said framework and having axially extending peripheral clamping means, an improved skinning blade assembly in combination therewith, comprising: a pair of blade support means mounted to said framework on opposite ends of said drum, adjacent a peripheral portion thereof; each of said support means including spaced lower and upper plates and a removable front end plug slidably engaged between said plates; means normally locking said plug means to said plates and removable therefrom to allow sliding removal of said plug means; blade means having the ends thereof received in said pair of support means, and a sharp edge parallel to the rotational axis of said drum; and camming means in operative relation with the back of said blade means to force said blade means against said plug means for securing and aligning said blade means.

9. In a skinning machine including a framework, and a rotatably driven drum mounted on said framework and having axially extending peripheral clamping means, an improved skinning blade assembly in combination therewith comprising: a pair of aligned blade support means mounted to said framework on opposite ends of said drum adjacent the periphery thereof; said support means each having spaced upper and lower elements defining a blade receiving slot therebetween; a skinning blade having its ends received in said slots, and including a tapered forward face and a sharp cutting edge; said support means each having a tapered stop block in abutment with said blade tapered face; and variable retention means in operative relation to the back of said blade to force it against said stop blocks.

10. The combination in claim 9 wherein said stop blocks are removably secured between said elements by taper pins.

11. In combination in a skinning machine including a framework, and a rotatably driven drum mounted on said framework and having axially extending peripheral clamping means, an improved skinning blade assembly having front blade loading and unloading, comprising: a pair of blade support means mounted to said framework on opposite ends of said drum, adjacent a peripheral portion thereof; each of said support means including spaced lower and upper members and a removable front end element engaged with said members; said members and elements forming blade receiving sockets; means normally locking said elements to said members and releasable therefrom to allow removal of said elements for blade end insertion and removal into and out of said sockets; blade means across said drum, having the ends thereof received in the sockets in said pair of support means, and having a sharp edge parallel to the rotational axis of said drum; and camming means in operative relation with said blade means to force the front of said blade means against said elements for securing and aligning said blade means.

References Cited
UNITED STATES PATENTS

| | | | |
|---|---|---|---|
| 2,681,675 | 6/1954 | Burch | 146—130 |
| 3,215,179 | 11/1965 | Schill | 146—130 |

FOREIGN PATENTS

| | | |
|---|---|---|
| 649,468 | 1/1951 | Great Britain. |

WILLIAM W. DYER, Jr., *Primary Examiner.*

JAMES M. MEISTER, *Examiner.*